United States Patent
Srebranig et al.

(10) Patent No.: US 8,543,851 B2
(45) Date of Patent: Sep. 24, 2013

(54) SYSTEM AND METHOD FOR MICROECONOMIC OPTIMIZATION OF POWER USAGE IN A DEVICE

(75) Inventors: Steven Srebranig, Schaumburg, IL (US); Mohammed I Alhroub, Glen Ellyn, IL (US)

(73) Assignee: STMicroelectronics, Inc., Coppell, TX (US)

( * ) Notice: Subject to any disclaimer, the term of this patent is extended or adjusted under 35 U.S.C. 154(b) by 321 days.

(21) Appl. No.: 12/980,793

(22) Filed: Dec. 29, 2010

(65) Prior Publication Data

US 2012/0173888 A1 Jul. 5, 2012

(51) Int. Cl.
*G06F 1/26* (2006.01)
*G06F 1/28* (2006.01)

(52) U.S. Cl.
USPC ........... 713/320; 713/300; 713/321; 713/323; 713/324; 713/340

(58) Field of Classification Search
USPC .................. 713/300, 320, 321, 323, 324, 340
See application file for complete search history.

(56) References Cited

U.S. PATENT DOCUMENTS

| | | | | |
|---|---|---|---|---|
| 5,752,046 A * | 5/1998 | Oprescu et al. | | 713/300 |
| 5,964,879 A * | 10/1999 | Dunstan et al. | | 713/340 |
| 2003/0158609 A1* | 8/2003 | Chiu | | 700/22 |
| 2005/0171753 A1* | 8/2005 | Rosing et al. | | 703/18 |
| 2008/0313640 A1* | 12/2008 | Liu et al. | | 718/104 |
| 2008/0316843 A1* | 12/2008 | Kim | | 365/191 |
| 2009/0144566 A1* | 6/2009 | Bletsch et al. | | 713/300 |
| 2011/0060932 A1* | 3/2011 | Conroy et al. | | 713/340 |
| 2012/0057894 A1* | 3/2012 | Tress et al. | | 399/88 |

* cited by examiner

*Primary Examiner* — Vincent Tran
(74) *Attorney, Agent, or Firm* — Graybeal Jackson LLP

(57) ABSTRACT

A system and method for optimizing power distribution in a closed system. In an electronic device, one may apply a plurality of driving algorithms for components that provide different variations functionality. Thus, each component may be operated according to one of several different algorithms depending on the level and manner of functionality needed. In this manner, the overall system may be optimized for any number of operating modes such that each component may conserve electrical power usage while still providing the needed functionality for specific components during each operating mode. Such an optimization assessment may be a function of an economic model applied to the system whereby functionality and components are assigned specific values and costs based on the required functionality for any given task. Thus, the amount of power available may be allocated in an efficient manner based on a cost-benefit analysis.

26 Claims, 3 Drawing Sheets

SYSTEM AND METHOD FOR MICROECONOMIC OPTIMIZATION OF POWER USAGE IN A DEVICE

BACKGROUND

Computer systems and electronic devices are used in many applications across many different industries and businesses. Typically, these computer systems and electronic devices use electrical power drawn from a typical electrical grid (e.g., plugged into 120 Volt, 60 Hz electrical outlet) for realizing functionality. Further, several kinds of devices remain plugged in and functioning continuously in some manner. For example, a typical television broadcast digital receiver (e.g., a set-top box) may remain functioning even when one is not watching any programming, such as when specific programming tagged for recording begins, the set-top box will record the programming without additional user input. Thus, the set-top box will remain plugged in and functioning regardless of whether or not the device is currently being used by a user.

With a growing number of computer systems and electronic devices continuously operating regardless of use by a user, more and more energy is used when devices set idle without use, yet still have all internal components operating at full functioning capacity. Thus, electrical energy may be wasted at great amounts (especially when cumulative and aggregate numbers are considered across a population of users) when devices remain at full functioning capacity but without actual use. Such systems and devices are inefficient and wasteful. Existing methods for controlling power consumed by electronic systems selectively disable devices within the system, using very specific and limited modes of overall operation (e.g., system On, system Standby, system Off). Moreover, conventional methods of power control rely almost exclusively on minimizing power consumption without regard to system performance. Thus, to solve these various problems, a system may employ a power control system that allows expanded modes of energy usage in regard to system performance at these modes, allowing system auto-optimization that matches desired or required performance with minimal power.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

Figure 1:
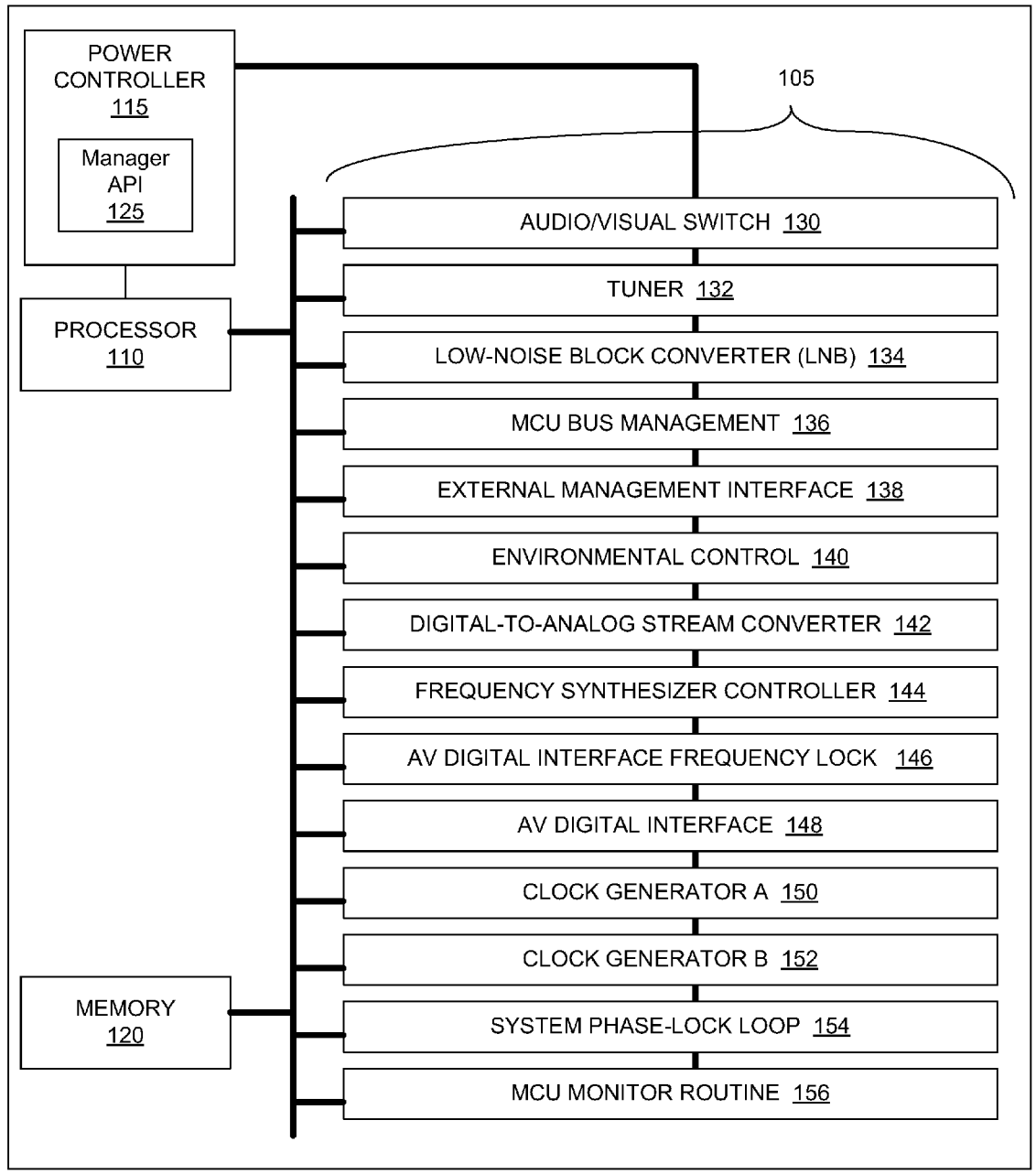
FIG. 1 is a block diagram of an embodiment of a closed system 100 having several components that may be powered through an optimization of power allocation method according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Prior to discussing specific details about aspects of the subject matter disclosed herein, an overview of the system and method is presented. Computer systems and devices may have several different components that provide different manners and levels of functionality, and this functionality often includes the use of software algorithms that routinely and automatically execute depending on how or how often the algorithm is called. Depending on the specific tasks that the computer system or device is currently performing, different components with the system may or may not be required for operation. Thus, some components, when not in use may be turned off to conserve electrical power usage. Further, depending on the required functionality, some components may also be driven at lower power levels by adjusting a basic characteristic, such as lowering the clock frequency, thereby also conserving energy. In a given system with known components, one may apply a plurality of driving algorithms for each component that provide different variations of one or more characteristics (such as clock frequency) to limit the power consumed. Thus, each component may be operated according to one of several different algorithms depending on the level and manner of functionality needed at the time for each component. In this manner, the overall system may be optimized for any number of given operating modes such that each component may be operated at a level suitable for conserving electrical power usage while still providing the needed functionality for specific components during each operating mode.

Such an optimization assessment may be a function of an economic model applied to the system whereby functionality and components are assigned specific values and costs based on the required functionality for any given task. Thus, the amount of power available may be allocated in an efficient manner based on a cost benefit analysis of both the power required to even turn on a component as well as the minimum power or minimum required use of a characteristic (e.g., clock frequency) to drive a particular component. Therefore, overall power consumption may be minimized by turning off unneeded components and driving needed components at a minimum level of power for maintaining the needed functionality. Various aspects of the this method and system are discussed below with regard to FIGS. 1-3 and in conjunction with a description of embodiments of a microeconomic for optimizing efficient use of resources.

FIG. 1 is a block diagram of an embodiment of a closed system 100 having several functional components 105 that may be powered through an optimization of power allocation method according to an embodiment of the subject matter disclosed herein. In this embodiment, the system 100 may be a broadcast digital receiver commonly used as a set-top box for consumer television applications. The system 100 includes a processor 110 coupled to a system bus 115 that is operable to provide communications between the processor 110 and several functional components 105 that are provided to realize various functions of a typical set-top box. Further, the system 100 includes a power controller 115 that uses a manager application programming interface (API) 125 for selecting and applying driving algorithms for each component 105. As will be discussed below, the power controller 115 may be suited to execute an optimization routine in order to determine the optimal use of the components through selection and application of the driving algorithms.

Figure 2:
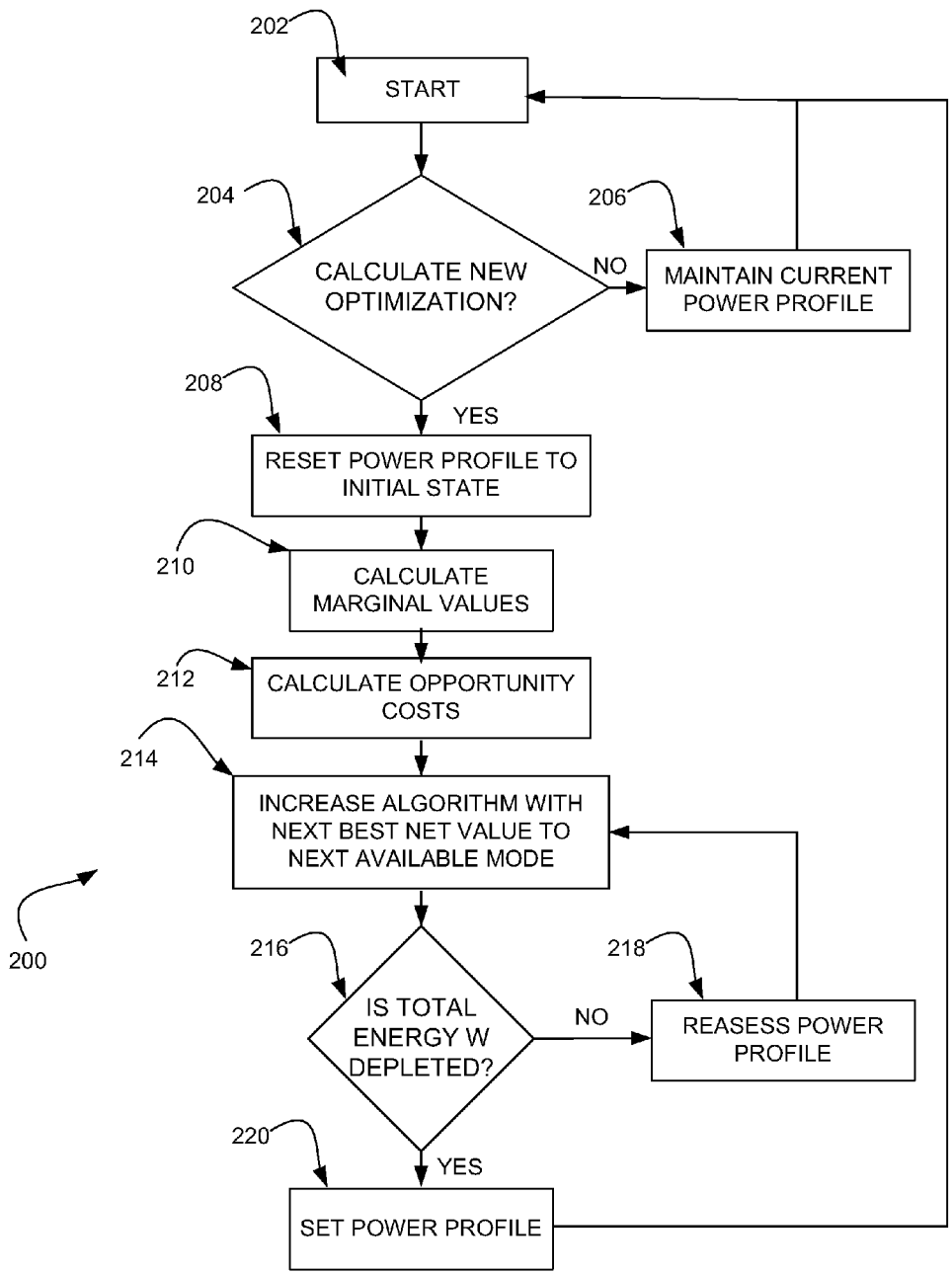
FIG. 2 is a flow diagram of a method for iteratively determining an optimal allocation of power for a system given a particular mode of operation or particular functionality requirements according to an embodiment of the subject matter disclosed herein.

The components 105 shown in FIG. 2 are exemplary for a digital broadcast receiver, but a skilled artisan understands that a device may include any number of components having differing functionality. Thus, in no specific order, the set-top box may include a memory 120, an audio visual switch 130, a tuner 132, a low-noise block (LNB) 134, a bus management system 136, an external interface management 138, an environmental control 140, a digital-to-analog stream controller 142, a frequency synthesizer control 144, an audio/visual (AV) digital interface frequency lock controller 146, an AV digital interface 148, clock generators A and B 148 and 150, system phase-lock loop blocks 152 and an MCR monitor routine 154. No further discussion of the functionality of these components 105 is discussed herein as it is enough to understand that these components 105 may or may not actually need to be functional depending on a specific mode of operation of the set-top box. Further, each block, even if needed, may also only need to operate with minimal power requirements or at minimal frequencies in order to provide functionality for specific modes. Thus, the controller 115 may implement a microeconomic-based analysis of system requirements and power drawn by components 105 to determine an optimal power distribution to each component 105 for any number of operating modes in order to determine the most efficient allocation of power at any given time. The steps of the micro-economic based analysis are discussed below with respect to FIG. 3, however, a discussion of the micro-economic terms and tenets are discussed next.

Borrowing concepts from microeconomic theory, one may define a set of algorithms that have variable but predictable impact on energy usage within a closed microeconomic system, the closed system in this case being the set-top box 100 of FIG. 1. The basis of the model is an application of limited resources to produce products that yield the most collective value. Each product costs a specific amount to produce and opportunity costs exist for products not produced precisely because of the limited resources for production. That is, assuming a manufacturing plant may only produce one product at a time, it would be economical to produce the most valuable product. As additional products may be produced simultaneously and at different rates, then an optimal amount of each product may be produced by analyzing the opportunity costs of not producing other products or more of specific products.

To apply this concept to an electronic device, one may define specific concepts within the system 100 around this model. This closed microeconomic system has a limited set of resource costs which may be likened to electrical power available (i.e., energy usage EU) and an interrelated product value (e.g., component performance value PV). The interrelationship between energy usage EU and performance value PV may be based on the notion of opportunity cost OC, such that optimization (e.g., minimization of energy usage EU with a maximization of performance value PV) within the system 100, may be realized by application of a set algorithms (e.g., the products) given a limited availability of power W (e.g., the resources). Thus, each component 105 may be optimized using a specific driving algorithm (e.g., one amongst a plurality of different driving algorithms associated with each component, respectively) such the overall system is optimized for performance given the limited power available.

Thus, in applying the model to the system of FIG. 1, each component algorithm may add "value" to the performance of the system 100. This performance value PV may be the amount of performance improvement that a particular component algorithm provides to the system for a particular mode of operation. The performance value PV, provided by each component algorithm, is a subjective evaluation (e.g., assigned by a system designer) and should be chosen to be as realistic as possible in relation to the other algorithms of the component as well as in relation to other components' algorithms.

For example, a performance value PV for tuner component in a first mode Mode1 may be arbitrarily set to a value of 1.5. That is, an algorithm that drives the tuner component 132 in the first mode Mode1 (which may be a standby mode, for example) is valued at 1.5. This may correspond to the concept that the first mode Mode1, it may be important to have the tuner operating in a minimum state so as to at least have some functionality, such as at least one video channel ready to be displayed when the system is initially operating. In different modes though, different algorithms may provide greater value for the tuner component 132. Thus, an algorithm for driving the tuner component 132 in a second mode Mode2 (which may be a nominal mode, for example) may provide additional functionality, such as the ability for a user to see a channel guide or to have favorite channels streamed to a buffer in case the user changes to favorite channels. The designer may arbitrarily choose a performance value PV of 3.0 for the second mode Mode2 for the corresponding algorithm for the tuner component 132. Thus, the designer considers the additional functionality of the tuner component 132 to be twice as valuable.

Further yet, in another mode Mode3 beyond nominal mode may be a maximum mode, but the designer may consider the performance value PV of the third mode Mode3 for the tuner component 132 to be of no value, i.e., PV=0 for the algorithm associated with the third mode Mode3 mode for the tuner component 132. Thus, the designer considers the next mode to be of no value regarding the tuner component 132. As can be deduced, each component 105 is associated with set of algorithms $A_0$-$A_n$ that are each associated with assigned performance values $PV_{A0}$-$PV_{An}$. Further, each algorithm may or may not correspond to overall system modes Mode0-ModeN With each algorithm having an assigned performance value $PV_i$ for each component, two additional calculations may be made for assessing the optimal distribution of power in a closed system 100. A marginal value $MV_i$ may be defined for each algorithm based upon the performance value $PV_i$ of the algorithm and the percentage of total power available used to engage the algorithm (e.g., run the component according to the particular component algorithm $A_i$) as defined by:

$$MV_i = PV_i * EU/W$$

wherein $EU_i$ is the energy usage for a given algorithm $A_i$ implementation and W is the constraint placed on total power available in the system. In this manner, each algorithm's performance value $PV^i$ may be countenanced against is required percentage of energy usage $EU_i$.

Additionally, an opportunity cost $OC_i$ may be defined for each algorithm based upon the next best mode's performance value $PV_j$ of the particular algorithm and the percentage of total power available used to engage the current algorithm as defined by:

$$OC_i = PV_j * EU/W$$

again, wherein $EU_i$ is the energy usage for a given algorithm $A_i$ implementation and W is the constraint placed on total power available in the system. In this manner, each algorithm's next best performance value $PV_j$ may be countenanced against the required percentage of energy usage $EU_i$ for the current algorithm. Opportunity Cost $OC_i$ is the marginal value lost by not applying the equivalent energy usage of an Algorithm $A_i$ to another Algorithm $A_j$ that would provide the next best performance for that energy usage. That is, the Opportunity Cost $OC_i$ of Algorithm $A_i$ is the proportion of the energy used for $A_i$ if $MV_j$ is the best or next best in relation to $MV_i$.

Lastly, a Net Value $netV_i$ (sometimes called operating value) may be defined as a value of Algorithm $A_i$, given its marginal value $MV_i$ and the opportunity cost $OC_{i,iBest}$, due to the loss of the best energy usage (Algorithm $A_{iBest}$) as defined by:

$$netV_i = MV_i - OC_{i,iBest}$$
$$= (Pv_i - PV_{iBest}) * EU_i / W$$

wherein this formula is constrained by $PV_{iBest}$ Best being the highest mode feasible with $EU_i$ less than or equal to $EU_j$.

The maximum performance value $PV_{iBest}$ an algorithm $A_i$ will be at the mode where additional energy usage $EU_i$ by that algorithm $A_i$ in a higher mode will not yield an increase in its net value $netV_i$ The maximum overall system benefit will be achieved when each individual algorithm $A_0$-$A_n$ has a net value $netV_i$ of nearly zero or the total energy specification W of the source is exhausted. That is, the distribution of energy usage $EU_0$-$EU_n$ among the algorithms $A_0$-$A_n$ that define the system 100 will then be optimum.

Turning now to FIG. 2, a flow chart of the iterative analysis to determine the optimal power distribution for given component requirements is presented. FIG. 2 is a flow diagram of a method for iteratively determining an optimal allocation of power for a system given a particular mode of operation or particular functionality requirements according to an embodiment of the subject matter disclosed herein. Throughout the discussion of FIG. 2 and its associated method, the above-described set-top box example will be used to further illustrate the method. Though a skilled artisan understand that, just like the system described above, the method of FIG. 2 may also be practiced in different system environments wherein allocation of power amongst components may be varied for optimized distribution and consumption.

The method may begin a starting point 202. Prior to performing an analysis, a system may need to be initialized to a starting point in order to iteratively increase power allocated to each components depending upon the functionality required for certain tasks. Such an initialization then will occur when a system is first turned on and may also reset each time a system is changed from aggregate mode to mode in order to reallocate power to provide needed functionality for different modes. Thus a query step 204 may be implemented that continuously monitors the system for events that would trigger a new power allocation analysis. If an event does not occur, the method maintains a continuous loop through step 206 whereby the current power profile (e.g., specific allocation of power previously determined to be optimal for the previous required functionality. If an event occurs that does require a new analysis, then the method proceeds to an initialization step 208 by turning on the device or by changing modes.

To become initialized, each component's algorithm Ai may be set to its respective lowest (i.e., Mode0) setting. Each component may have any number of modes with a minimum number of two modes (e.g., Off Mode which is inherently Mode0 for each component and at least one On Mode which would be Mode1 for a component with just two modes of operation). Typically, a component may have five modes of operation, each mode providing increasing functionality with increased energy usage EU. For example, in a set-top box device 100, the tuner component 132 may have five operating modes comprising: off (Mode0); standby (Mode1); minimal (Mode2); nominal (Mode3); and maximum (Mode4). Each tuner 132 mode may have different algorithm $A_0$-$A_4$ associated with each mode to provide needed functionality.

Further, in order to maintain specific energy usage EU requirements across the system, industry standards may require that the total power usage W in any given system mode to be held at or below a specific total power usage W. Thus, each component may be controlled by the power controller 115 according to the above-described specific algorithm $A_0$-$A_4$ such that the total sum of energy usage $EU_0$-$EU_n$ remains at or below the system constraint of total power W. When initialized at step 208 then, the total power constraint W is set.

Next, for each component in the system, the above-described parameters are calculated, namely each component's marginal value set $MV_i$-$MV_j$ and opportunity cost set $OC_i$-$OC_j$. These are calculated respectively at steps 210 and 212 in the flow chart of FIG. 2. With all of these values calculated, the method may then move to step 214 for determination of the most optimal component to advance from its initialized Mode0 to a first Mode1. This is accomplished by calculating the NetVi for each option at this step. That is, amongst all of the components, a NetVi may be calculated as the value of changing one component from its current mode (presumably Mode0 when initialized) to the next (Mode1 when first starting).

After changing at least one component's algorithm (e.g., switching from ModeN to ModeN+1), another query step 216 determines whether or not the available total power W is depleted as a result of increasing the energy usage EU of the one or more components in step 214. If the total power W is depleted, then the optimization analysis ends at step 220 where the new power profile is implemented. The method may loop back around to the start wherein the system monitors for events that would require a new analysis.

If there remains power available (e.g., W is greater than zero yet), then the method loops back to step 216 wherein the next best option is selected. That is, after implementing an algorithm change in the previous most valuable choice, a new most valuable change emerges from the options available (e.g., the next component having the best $NetV_i$). This looping iteratively cycles until W is depleted or until the remaining choices are all choices having a $NetV_i$ equal to zero—thus no additional changes provide any additional value.

To further illustrate the concepts of FIG. 2, an iterative example is provided next. As an example, one may define a discrete set of five modes Mode0-Mode4 (which may be called off, standby, minimum, nominal, and maximum, respectively) for the tuner 132 algorithm. Mode0 ("off") could designate that no functions of the tuner 132 are used and the tuner 132 is effectively shut down. In this Mode0, the Algorithm provides no benefit (e.g., performance value $PV_i$) to the system and energy usage $EU_i$ nothing. Mode1 ("standby") could be the activation of functions to poll when the system needs the tuner 132, otherwise, all other functions and related hardware of the tuner 132 are not activated. In Mode1, the tuner algorithm provides some benefit to the system and an associated energy usage $EU_i$ that is finite but small. Mode2 ("minimum") could be a steady state operation where only functions that demodulate incomings signal are active. In Mode2, the tuner algorithm provides a larger benefit to the system with an increased cost of energy usage $EU_i$.

Mode3 ("nominal") could be a most-often-used state where the tuner 132 will run steady state while monitoring any loss of signal quality or frequency drift and relock. In this Mode3, the tuner algorithm provides a significant benefit to the system with potentially significant increase in energy usage $EU_i$. Lastly, Mode4 ("maximum") could be full tuner 132 operation where all functions are engaged, e.g., set controls to lock to a specified tuner frequency, or scan for a frequency, and provide the system the optimum quality IF signal for decoding. In Mode4, the tuner algorithm provides the most benefit to the system with the highest cost of energy usage $EU_i$.

Other components may have one, some, all, or more of these associated modes respectively associated with each component. That is, some components may simply have an off mode and a nominal mode (e.g., on) while others may have more than the five example modes of the tuner 132 algorithm. Further, the overall device may have similar overall modes that dictate the nature of the functionality needed from each component. For this example, however, only the context of the tuner 132 algorithm is presented.

Thus, an overall power constraint W may be set for power consumption in the overall system. The tuner algorithm will then have associated performance values $PV_{i-j}$ and associated energy usages $EU_{i-j}$ for each mode that help determine which mode of the tuner algorithm can optimally be used within the overall power constraint W.

Continuing the example, the tuner 132 algorithm may take on modes from Mode0 to Mode4, with Mode0 the lowest energy usage $EU_i$ mode. The associated performance values $PV_{i-j}$ may subjectively be defined as {0, 10, 50, 100, 75}, and a corresponding set of Energy Usages $EU_{i-j}$ to the overall system may be determined to be {0 W, 0.1 W, 0.25 W, 0.40 W, 0.50 W}. If the overall power constraint W is set to 0.3 W, then in this simple example, the method will (during a first iteration) move from Mode0 to Mode1 for the tuner algorithm thereby giving a performance value benefit of 10 while only consuming 0.1 W ($EU_{Mode1}$) of available energy. At next pass, the tuner algorithm switches from Mode1 to Mode2 yielding an additional performance value benefit of 50 while only consuming 0.25 W ($EU_{Mode2}$). However, at the next iteration, the tuner algorithm cannot be switched from Mode2 to Mode3 because the required energy usage ($EU_{Mode3}$) is 0.40 W which is beyond the power constraint W of 0.30 W; this despite the additional performance value of 100. With the caveat of a single component system, the cost-benefit iterative analysis is simple and not very useful. But as additional components are introduced, then additional factors are considered, e.g., the performance values and energy usages for the second, third and additional components.

Thus, if a second component is introduced, such as a frequency synthesizer control 144 algorithm, then an additional set of performance values and energy usages are considered. Continuing the example, the frequency synthesizer control 144 algorithm may also take on modes from Mode0 to Mode4, with Mode0 the lowest energy usage $EU_i$ mode. The associated performance values $PV_{i-j}$ of this algorithm may subjectively be defined as {0, 5, 5, 200, 275}, and a corresponding set of Energy Usages $EU_{i-j}$ to the overall system may be determined to be {0 W, 0.05 W, 0.05 W, 0.05 W, 0.05 W}. With these parameters, one can see that the energy usage for this component is low when compared to the tuner 132. However, the performance benefits are minimal until reaching Mode3. If the system is still operating under the power constraint W of 0.30, then an iterative analysis would show the best performance value would initially come from moving the tuner from Mode0 to Mode2 while still staying under the power constraint W. However, the next most efficient and beneficial move would be to move the frequency synthesizer control 144 algorithm from Mode0 all the way to Mode4 because of the minimal energy usage and high performance value. As more and more components are considered, then relationships between associated performance values and energy usages takes on greater complexity as each relationship is calculated by the respective marginal values and opportunity costs described previously. An iterative analysis with the large number of variables may be solved to yield an optimal distribution of power through the use of modes across each component.

Figure 3:
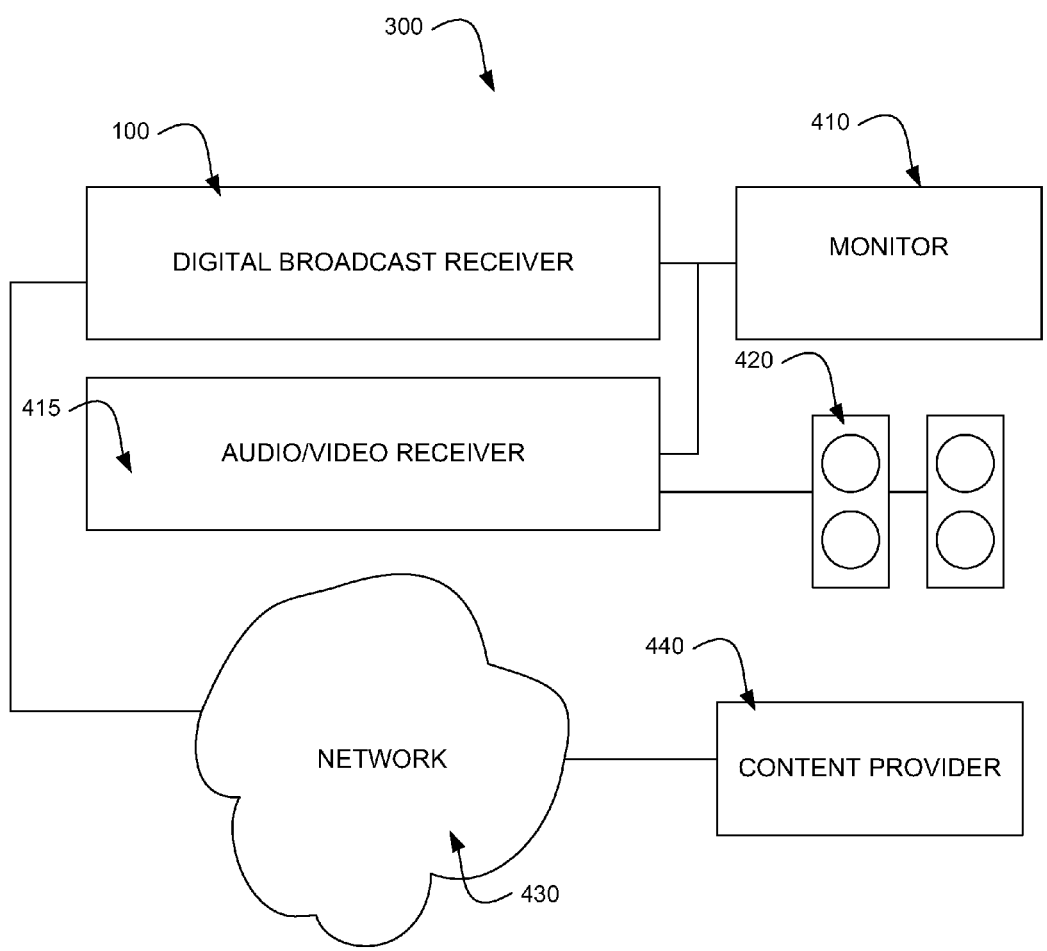
FIG. 3 is a block diagram of a system capable of employing the system of FIG. 1 and the method illustrated in FIG. 2 according to an embodiment of the subject matter disclosed herein.

FIG. 3 is a block diagram of an embodiment of a system 300 that may implement the digital broadcast receiver 100 of FIG. 1. In this system embodiment, the system 300 may include the processor digital broadcast receiver 100 coupled to a monitor 410 (which may be a flat-screen television, for example) which may be operable to display video images. Further, digital broadcast receiver 100 may be coupled to an audio/video receiver 415 that is operable to interact with the digital broadcast receiver 100 for manipulating audio and video signals to be displayed on the monitor 410 or played through speakers 420. Further yet, the digital broadcast receiver 100 may be coupled to a network 430 (such as the Internet, for example, or a satellite receiving dish as another example) such that content may be sent to and received from a content provider 440.

Such a system 300 may further include any number of devices including a CD player, a DVD player, a Blu-Ray player, a personal computer, a server computer, a smart phone, a wireless personal device, a personal audio player, media storage and delivery system or any other system that may read and write data to and from a storage medium or communication channel. Such additional devices are not shown in FIG. 3.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. An electronic device, comprising:
   a power supply having a fixed amount of energy available;
   a plurality of components, each component associated with a respective performance value and configured to be powered by the power supply;
   a processor configured to calculate a net value for each component that is based on the component's respective performance value and an amount of energy required to operate the respective component; and
   a controller configured to iteratively allocate energy to components having higher net values until the energy from the power supply is depleted.

2. The electronic device of claim 1, wherein each component further comprises a plurality of operating modes such that each operating mode for each component is associated with a performance value and wherein the processor calculates net values for each operating mode of each component.

3. The electronic device of claim 2, wherein the processor is further configured to calculate an opportunity cost associated with a first operating mode and a next successive operating mode for each component such that the net value is further based upon the opportunity cost calculated for the next successive operating mode.

4. The electronic device of claim 1, wherein the energy comprises a finite amount of electrical power.

5. The electronic device of claim 1, wherein the performance value associated with each component comprises a subjective numerical assessment of the functionality provided to the electronic device.

6. The electronic device of claim 1, further comprising a memory coupled to the controller and configured to store optimal energy distribution settings.

7. The electronic device of claim 1, wherein the controller is further configured to control the frequency of a clock that drives components to realize the allocation of energy.

8. The electronic device of claim 1, wherein each component provides functionality to the electronic device when provide with energy.

9. A method for allocating power in a device having components, the method comprising:
   determining a plurality of operating modes for each component of the device;
   associating an operating value for each component in the device based on the operating mode;
   calculating an opportunity cost associated with a first operating mode and a next successive operating mode for each component such that the operating value is further based upon the opportunity cost calculated for the next successive operating mode; and
   iteratively allocating an amount of power to each component based on a comparison of each component's respective associated operating value at each respective operating mode.

10. The method of claim 9, wherein power is allocated iteratively to components until a finite amount of power is allocated.

11. The method of claim 9, further comprising associating a performance value with each component based on a subjective numerical assessment of the functionality provided by each respective component to the device.

12. The method of claim 9, further comprising storing an allocation of power in a memory coupled as a known power distribution setting.

13. A system, comprising:
   a power supply configured to supply a total amount of power W;
   a plurality of components, each component having a plurality of operating modes, each operating mode of each component associated with a performance value PVi and associated with an energy usage EUi;
   a processor configured to calculate a marginal value MVi according to:

$$MVi = PVi * EUi/W$$

the processor further configured to calculate an opportunity cost according to:

$$OCi = PVj * EUi/W;$$

wherein PVj is associated with the performance value of a next available operating mode for the component associated with the energy usage EUi; the processor still further configured to calculate a net value NetVi according to:

$$netVi = MVi - OCi_{,iBest};$$

wherein $OCi_{,iBest}$ is the opportunity cost associated with the operating mode of the component with the next highest marginal value; and
   a controller configured to distribute power to component that maximizes net value to the system.

14. A controller, comprising
   a plurality to control nodes configured to respectively enable power distribution from a power supply to one or more of a plurality of components, wherein each component is associated with a respective performance value;
   a calculator configured to calculate a net value for each component that is based on the component's respective performance value and an amount of energy required to operate the respective component; and
   a control unit configured to iteratively allocate energy to components having higher net values until the energy from the power supply is depleted.

15. The controller of claim 14, wherein the control unit is configured to enable operation of an operating mode of a component if the controller determines the operating mode to have the next highest net value.

16. The controller of claim 14, wherein the control unit is configured to change an operating frequency of a clock associated with an operating mode of a component if the controller determines the operating mode to have the next highest net value.

17. The controller of claim 14, wherein the control unit is configured to disable operation of an operating mode of a component if the controller determines the operating mode to have the next highest net value and a threshold of power from the power supply is met or exceeded.

18. An electronic device, comprising:
   a plurality of electronic components;
   a processor coupled to each of the plurality of components;
   a power management controller coupled to the processor and configured to:
      determine an operating mode of the device and determine a marginal value for operating each component in the determined operating margin in relation to operating each component in a different operating mode;
      assign performance values to each component based on the determined operating mode;
      iteratively determine an optimal distribution of power to each component based on the performance values of each component.

19. The electronic device of claim 18, wherein the power management controller is further configured to determine an opportunity cost value for operating each component in the determined operating margin in relation to operating each component in a different operating mode.

20. The electronic device of claim 18, wherein the power management controller is further configured to maintain specific functionality by operating specific components if the determined operating mode requires the specific functionality.

21. The electronic device of claim 18, wherein the power management controller is further configured to cause operation of specific components to be ceased if the determined operating mode does not require specific functionality of the specific components.

22. The electronic device of claim 18, wherein the power management controller is further configured to:
   receive an input to change device operating modes; and
   perform a second iterative determination of an optimal distribution of power to each component based on the performance values of each component.

23. An audio/video receiver, comprising:
   a power supply having a fixed amount of energy available;
   a plurality of audio/video components, each component associated with a respective performance value and configured to be powered by the power supply;

a processor configured to calculate a net value for each component that is based on the component's respective performance value and an amount of energy required to operate the respective component; and a controller configured to iteratively allocate energy to components having higher net values until the energy from the power supply is depleted.

24. The audio/video receiver of claim 23, wherein the fixed amount of energy comprises a limitation placed on the power supply to comply with energy conservation regulations.

25. The audio/video receiver of claim 23, wherein the fixed amount of energy is drawn from a source having a voltage of 120 V and a frequency of 60 Hz.

26. The audio/video receiver of claim 23, wherein the plurality of audio/video components comprise an audio visual switch, a tuner, a low-noise block, a bus management system, an external interface management, an environmental control, a digital-to-analog stream controller, a frequency synthesizer control, an audio/visual digital interface frequency lock controller, an audio/visual digital interface, a clock generators, a system phase-lock loop block and a monitor routine block.

* * * * *